United States Patent Office 3,223,179
Patented Dec. 14, 1965

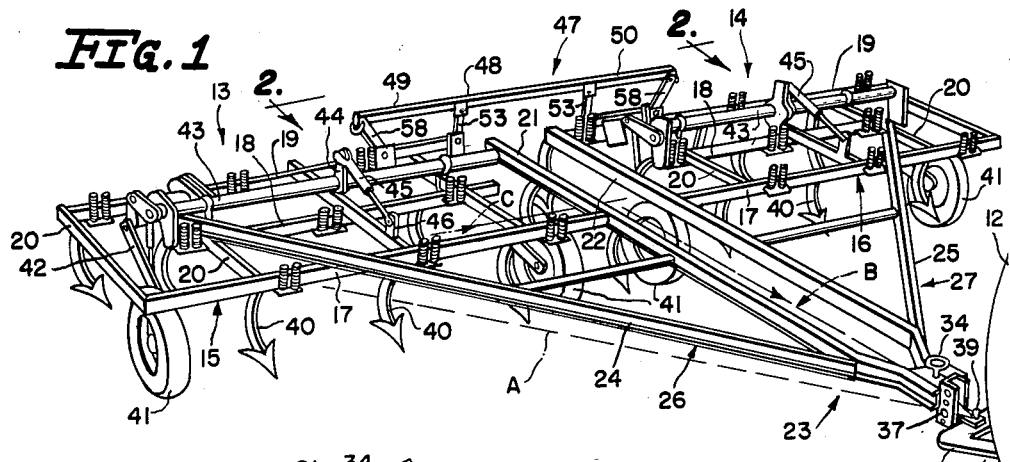

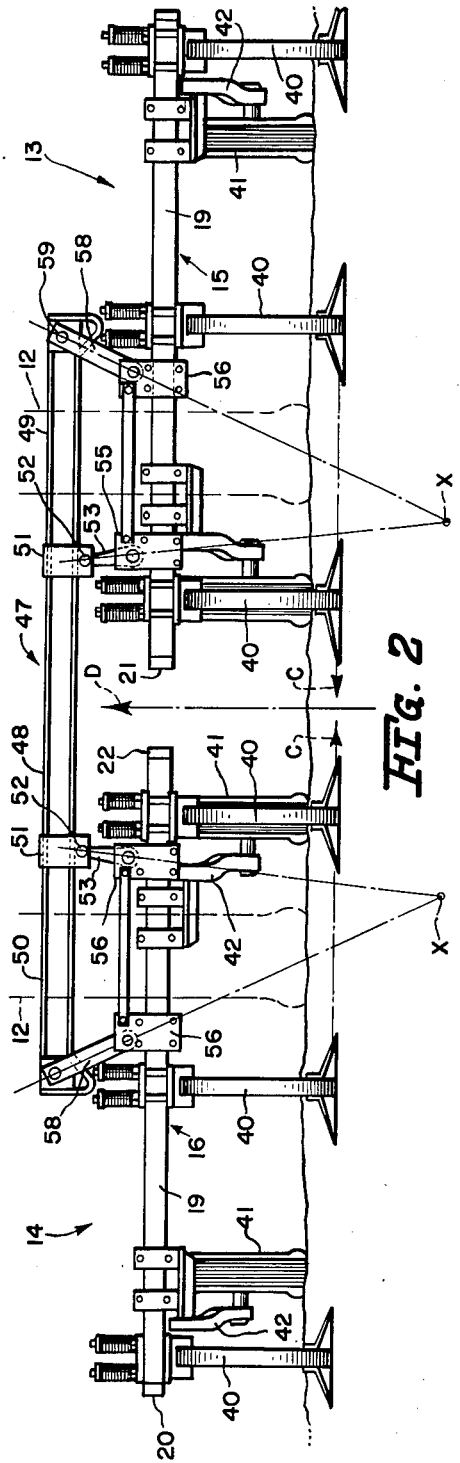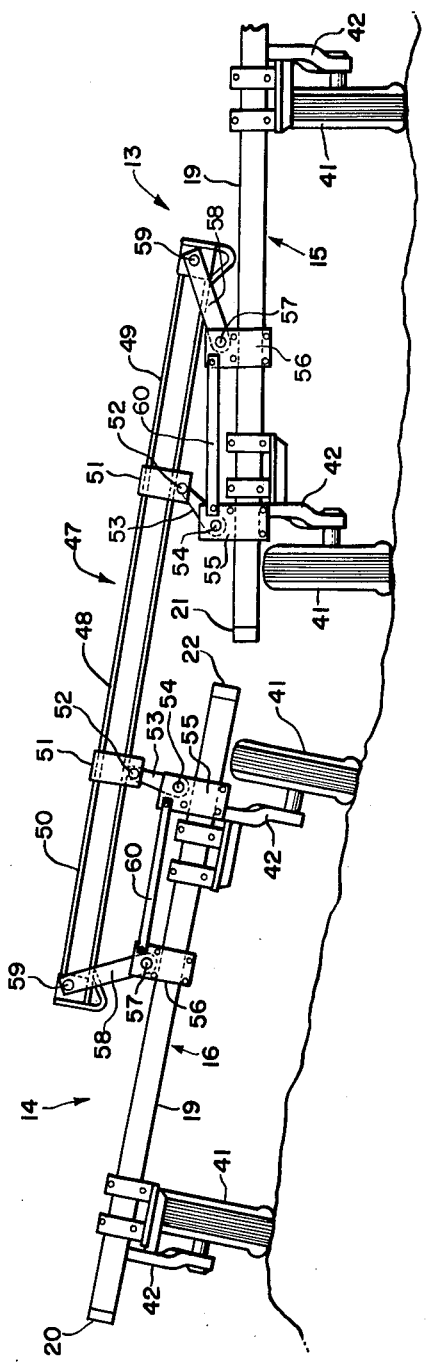

3,223,179
AGRICULTURAL IMPLEMENT
Hugh John MacKenzie, Ancaster, Ontario, Canada, assignor to International Harvester Company, Chicago, Ill., a corporation of New Jersey
Filed Mar. 23, 1964, Ser. No. 353,985
11 Claims. (Cl. 172—624)

This invention relates to agricultural implements and particularly to earthworking devices. More specifically, the invention concerns the joining of multiple implements in end-to-end relation for wider field coverage.

It is common practice in the agricultural industry for an operator to connect two or more conventional implements such as field plows and the like in transverse alignment to form a duplex machine for wider coverage and to provide a common hitch structure for connecting the implement to the tractor. An important obstacle to the satisfactory operation of such implements, especially over uneven terrain has been the failure of the individual units to achieve uniform depth of operation of the earthworking elements. Where a rigid or substantially rigid connection between the units was made a change in elevation affecting one part of the implement would adversely affect the uniform operation of the other parts of the implement, and where too much freedom was permitted between individual implement units draft forces caused some of the earthworking elements to rise and in some cases to leave the ground. The present invention contemplates the provision of a duplex implement of novel construction.

Another object of the invention is the provision of novel means for controlling the operation of a multiple unit or duplex implement.

Another object of the invention is the provision of novel means for joining the units of a duplex implement to stabilize the draft forces acting thereon and provide uniform operation under all conditions.

A further object of the invention is the provision, in an implement including aligned multiple units connected by a common hitch to a draft vehicle, of connecting means between the units accommodating relative freedom of movement of the individual units while offsetting or counterbalancing the adverse draft forces acting upon the implement to provide uniform operation of all the units.

Other objects and advantages of the invention will become clear from the following detailed description when read in conjunction with the accompanying drawings, wherein:

FIGURE 1 is a perspective view of a duplex field plow incorporating the features of this invention connected to a tractor to be drawn thereby;

FIGURE 2 is an enlarged rear elevation, with parts removed, of the implement shown in FIGURE 1;

FIGURE 3 is a view similar to FIGURE 2, with parts removed, showing the relative positions of adjacent implement units when the implement is travelling over uneven ground and illustrating the action of the apparatus by which the implement is stabilized;

FIGURE 4 is an enlarged detail of a portion of the hitch mechanism by which the implement is connected to a tractor;

FIGURE 5 is a plan view of the structure shown in FIGURE 4, and

FIGURE 6 is a section on the line 6—6 of FIGURE 5.

The duplex implement shown in FIGURE 1 is connected in trail-behind relation to the drawbar 10 of a tractor 11 having laterally spaced drive wheels 12, and comprising a pair of side-by-side earthworking implement units 13 and 14, having rectangular tool-carrying frames 15 and 16, respectively. Each of said frames includes longitudinally spaced transverse bars 17, 18 and 19 connected by a plurality of spaced longitudinally extending bars 20, and elongated inner bars 21 and 22 the ends of which project forwardly to form a portion of the implement hitch means 23. The inner bars 21 and 22 of the implement unit frames 15 and 16 form with diagonal bars 24 and 25, affixed to the respective unit frames, hitch frames 26 and 27.

Bars 21 and 22 are bent inwardly and forwardly at their forward ends and are connected by pivot means including a yoke 28 carrying a laterally extending pivot pin 29 received in an opening provided in the forward end of bar 22. The spaced arms of yoke 28 are apertured to receive longitudinally extending pins 30 carried by a swivel 31 confined between vertically spaced plates 32 affixed, as by welding, to the inner face of the forward end of bar 21. A vertically extending pin 33 having an eye 34 passes through an opening in swivel 31 and registering openings provided in the plates 32.

A vertical channel 35 is affixed, as by welding, to plates 32 and is provided with vertically spaced openings 36 to receive a pin 37 upon which is pivotally mounted the rear end of a tongue 38, forming single hitch means by which the units 13 and 14 forming the duplex implement of this invention are connected to the drawbar 10 of the tractor through the intermediary of coupling pin 39.

The connection of coupling pin 39 to drawbar 10 is relatively loose, and from the foregoing it should be clear that the duplex implement of this invention is capable of vertical as well as horizontal movement with respect to the tractor drawbar 10, and that each of the implement units 13 and 14 is capable of vertical movement about the transverse axis of pin 29. Each of these units is also capable of lateral tilting about a horizontal longitudinal axis represented by the pins 30. The connection of tongue 38 to the drawbar 10 of the tractor is substantially on the centerline between units 13 and 14.

It should be understood that in an implement of the type shown in drawings, the theoretical line of draft from the hitch point on the tractor extends in the case of each of the units 13 and 14 to a centrally located earth-penetrating element 40 at the rear of the unit. Earth-penetrating elements 40 are mounted on the transverse bars 17, 18 and 19 by means forming no part of this invention. Each of the implement units or sections 13 and 14 is supported by wheels 41, each of which is carried by an arm 42 secured to a transverse rockshaft 43 rockably mounted on the frame and having an arm 44 affixed thereto connected to one end of extensible means in the form of a turnbuckle 45 or the like, the other end of which is anchored to a lug 46 secured to one of the longitudinal brace bars 20 of the frame.

As the implement units 13 and 14 are propelled through the ground by the tractor 11, the line of forward draft on each unit extends from the connecting pin 39 on the tractor drawbar during operation of the implement to a point below the ground line represented by an earth-penetrating tool 40 disposed proximate the middle of the frame as represented by the broken line A indicated in the perspective view of FIGURE 1. Since the point of draft 39 is located midway of the implement units, and side draft forces acting on the units during operation urge the units inwardly, a vector diagram for each unit shows by the arrows in FIGURE 1 a forwardly directed force B, and a lateral force C, the resultant being represented by force A. In order to maintain uniform penetration of the earthworking tools 40 it is necessary to offset or counterbalance there forces acting on the implement, and this is accomplished by the provision of the stabilizer means indicated at 47, which holds the units apart and causes a vertical force component represented by the force line and arrow D in FIGURE 2.

Stabilizer means 47 comprises a transversely extending bar 48 extending above and having end portions 49 and 50 overlapping and extending substantially beyond the ends of the respective frames 15 and 16. Each section 49 and 50 of bar 48 has secured thereto a clamp 51 carrying a pivot pin 52 to which is connected one end of a link 53, the other end of which is mounted upon a pivot pin 54 carried by a clamp 55 secured to the rear transverse frame bar 19. Another clamp 56 mounted on bar 19 carries a pivot pin 57 upon which is mounted a link 58 comprising spaced parts straddling the respective ends 49 and 50 of bar 48 and connected thereto by pivot pins 59. Clamps 55 and 56 are braced by a spacer bar 60.

As indicated by broken lines in FIGURE 2, each pair of links 53 and 58 converge downwardly to provide a virtual pivot point designated X within the zone of the side draft forces represented by the letter C, the forces acting on the implement sections being transmitted to bar 48 through the links 53 and 58, acting as compression and tension links, respectively, to maintain the forces in equilibrium. Thus, as indicated in FIGURE 3, when the implement is traveling over uneven ground, stabilizer 47 permits great flexibility between the units 13 and 14 to allow them to follow the contour of the ground while maintaining them in the attitude required for uniform penetration of the earthworking tools. Lateral swinging of the implement, relative vertical movement of the units 13 and 14 and tilting thereof about a longitudinal axis occur by virtue of the novel hitch construction including the pin connections 29, 30, 37 and 39, allowing the implement to follow in the path of the tractor over ground of varying contour while maintaining a substantially constant operating depth of the earthworking tools.

It is believed that the construction and operation of the novel duplex plow of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In a tractor drawn implement having transversely aligned earthworking units and hitch means for connecting the implement to the tractor in draft receiving relation, each unit including a tool-carrying frame operatively connected to the tractor for independent vertical floating movement relative to the other tool-carrying frame to accommodate the implement to changes in ground contour, the combination of stabilizer means connecting said frames, comprising a transverse rigid member vertically spaced from said frames, and spaced link means extending generally vertically from and pivotally connected to said rigid member and to the respective inner ends of said frames to maintain a substantially uniform operating depth for each of said earthworking units.

2. The invention set forth in claim 1, wherein the connection of said hitch means to the tractor includes pivot means accommodating said independent vertical floating movement of said earthworking units and independent tilting thereof about a longitudinal axis extending in the direction of travel of the implement.

3. The invention set forth in claim 1, wherein said rigid member extends above and overlaps the inner ends of said frames and said link means comprises a pair of spaced link members extending between said rigid member and each of said frames, the relationship between the links of each pair of links being such as to offset the draft forces acting on said units.

4. The invention set forth in claim 1, wherein said hitch means includes separate hitch frames rigidly affixed to and extending forwardly from each of said units, said hitch frames being interconnected at their forward ends by means accommodating relative pivoting of said units about transverse and horizontal axes and single means is provided for connecting said hitch frames to the tractor.

5. The invention set forth in claim 3, wherein the links of each of said pair of links converge in a direction to intersect at a virtual hitch point on a force line directed laterally inwardly against each of said units.

6. The invention set forth in claim 5, wherein one of the links of each said pair of links acts in tension and the other link of said pair acts in compression to counterbalance the tendency for the forces acting on said units to cause the inner ends thereof to rise during operation of the implement.

7. In a tractor drawn implement having transversely aligned earthworking units, each said unit including a tool-carrying frame and a hitch frame rigid therewith and extending forwardly therefrom for connection to the tractor in draft-receiving relation, pivot means interconnecting the forward ends of said hitch frames for independent vertical movement of one said unit relative to the other about a transverse axis to accommodate the implement to changes in ground contour, additional pivot means in said connecting means accommodating tilting of one said unit relative to the other about a longitudinal axis, connecting means between said units limiting the relative movement thereof, a transverse stabilizer bar disposed above and overlapping the inner ends of said units, and link means pivotally connected to said stabilizer bar and to said units.

8. In a tractor drawn implement having transversely aligned earthworking units, each said unit including a tool-carrying frame and a hitch frame rigid therewith and extending forwardly therefrom, common hitch means connecting said hitch frames to the tractor in draft receiving relation on a line between said units, and means pivotally connecting each of said hitch frames to said common hitch means for independent vertical floating movement to accommodate the implement to changes in ground contour, whereby side draft forces are directed laterally inwardly against each of said units during forward travel of the implement tending to force the inner ends of said units inwardly, and upwardly, and a stabilizer arranged to counterbalance said forces, comprising a bar disposed above the inner ends of said tool-carrying frames and downwardly extending links pivotally connected to said bar and to each of said tool-carrying frames.

9. The invention set forth in claim 8, wherein a pair of said links connect said bar to each of said tool-carrying frames, one of the links of each said pair being in tension and the other link in compression to counterbalance the draft forces acting on said units during operation of the implement.

10. The invention set forth in claim 9, wherein said bar extends transversely of the implement and said links are pivotally connected to said tool-carrying frames adjacent the inner ends thereof.

11. The invention set forth in claim 8, wherein pivot means are provided in the connection of said hitch frames to the tractor accommodating said vertical movement of one of said units relative to the other, said connection including longitudinal pivot means for lateral tilting of each said unit relative to the other about a longitudinal axis.

References Cited by the Examiner

UNITED STATES PATENTS

| 1,266,799 | 5/1918 | Harbour | 172—677 X |
| 1,428,543 | 9/1922 | Gallagher | 172—658 X |

FOREIGN PATENTS

| 198,554 | 12/1957 | Germany. |
| 445,175 | 2/1926 | Germany. |

ABRAHAM G. STONE, *Primary Examiner.*

T. GRAHAM CRAVER, ANTONIO F. GUIDA,
*Examiners.*